US008917322B2

(12) United States Patent
Olson et al.

(10) Patent No.: US 8,917,322 B2
(45) Date of Patent: Dec. 23, 2014

(54) METHOD AND APPARATUS FOR DIGITAL VIDEO LATENCY REDUCTION BY REAL-TIME WARPING

(75) Inventors: Andrew C. Olson, Palmdale, CA (US); Brian E. Brinck, Quartz Hill, CA (US); John N. Konyn, Riverside, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 337 days.

(21) Appl. No.: 13/078,832

(22) Filed: Apr. 1, 2011

(65) Prior Publication Data

US 2012/0249784 A1 Oct. 4, 2012

(51) Int. Cl.
*H04N 7/18* (2006.01)
*G06T 3/00* (2006.01)

(52) U.S. Cl.
CPC .............. *H04N 7/183* (2013.01); *G06T 3/0093* (2013.01)
USPC ......................................................... 348/143

(58) Field of Classification Search
CPC .............................. H04N 7/183; G06T 3/0093
USPC .......................................................... 348/143
See application file for complete search history.

(56) References Cited

U.S. PATENT DOCUMENTS

| | | | | |
|---|---|---|---|---|
| 4,645,459 | A * | 2/1987 | Graf et al. ........................ | 434/43 |
| 4,805,121 | A * | 2/1989 | Scott et al. ..................... | 345/421 |
| 4,835,532 | A * | 5/1989 | Fant ............................. | 345/611 |
| 5,796,426 | A * | 8/1998 | Gullichsen et al. ......... | 348/207.99 |
| 5,855,483 | A * | 1/1999 | Collins et al. ................. | 434/322 |
| 6,049,619 | A * | 4/2000 | Anandan et al. .............. | 382/107 |
| 6,618,511 | B1 * | 9/2003 | Mancuso et al. .............. | 382/293 |
| 6,804,416 | B1 * | 10/2004 | Bachelder et al. ............. | 382/294 |
| 7,742,077 | B2 * | 6/2010 | Sablak et al. ............ | 348/208.99 |
| 2002/0176635 | A1 * | 11/2002 | Aliaga et al. ................... | 382/284 |
| 2002/0180727 | A1 * | 12/2002 | Guckenberger et al. ....... | 345/418 |
| 2004/0218894 | A1 * | 11/2004 | Harville et al. .................. | 386/46 |
| 2005/0018058 | A1 * | 1/2005 | Aliaga et al. ................... | 348/239 |
| 2005/0151963 | A1 * | 7/2005 | Pulla et al. ............... | 356/139.03 |
| 2005/0249426 | A1 * | 11/2005 | Badawy ......................... | 382/241 |
| 2005/0271301 | A1 * | 12/2005 | Solomon et al. .............. | 382/294 |

(Continued)

OTHER PUBLICATIONS

Pampoy et al., Visual Servoing for UAVs, Apr. 2010, Intech, ISBN 978-953-307-095-7, pp. 234.*

(Continued)

*Primary Examiner* — Sath V Perungavoor
*Assistant Examiner* — Peter D Le
(74) *Attorney, Agent, or Firm* — McDermott Will & Emery LLP

(57) ABSTRACT

In one aspect, video latency reduction by real-time warping is described. In one aspect, an original geometric image model of a digital video frame is adjusted according to a video frame latency, to form an adjusted geometric image model. A geometric image model may represent a field of view from a remote camera used to capture the digital video frame. The adjusted geometric image model may be overlaid onto the original geometric image model to capture a warped image. In one aspect the warped image is re-projected according to the adjusted geometric image model to form a re-projected image. The re-projected image may then be displayed to approximate a real-time field of view from a camera used to capture the digital video frame. In one aspect, an attitude and runway alignment of an unmanned aerial vehicle may be controlled using a displayed, re-projected image. Other aspects are described and claimed.

20 Claims, 13 Drawing Sheets

(56) References Cited

U.S. PATENT DOCUMENTS

| | | | |
|---|---|---|---|
| 2006/0041375 A1* | 2/2006 | Witmer et al. | 701/208 |
| 2006/0139475 A1* | 6/2006 | Esch et al. | 348/340 |
| 2006/0285755 A1* | 12/2006 | Hager et al. | 382/224 |
| 2007/0003165 A1* | 1/2007 | Sibiryakov et al. | 382/294 |
| 2007/0135979 A1* | 6/2007 | Plante | 701/35 |
| 2007/0159524 A1* | 7/2007 | Kim et al. | 348/36 |
| 2007/0159527 A1* | 7/2007 | Kim et al. | 348/97 |
| 2007/0244608 A1* | 10/2007 | Rath et al. | 701/3 |
| 2008/0089577 A1* | 4/2008 | Wang | 382/154 |
| 2009/0096790 A1* | 4/2009 | Wiedemann et al. | 345/427 |
| 2010/0008565 A1* | 1/2010 | Chien | 382/154 |
| 2010/0272348 A1* | 10/2010 | Pulla et al. | 382/154 |
| 2010/0295945 A1* | 11/2010 | Plemons et al. | 348/148 |
| 2012/0038549 A1* | 2/2012 | Mandella et al. | 345/156 |
| 2012/0314077 A1* | 12/2012 | Clavenna et al. | 348/159 |

OTHER PUBLICATIONS

Nishino, Introduction to Computer Vision, 2010, Nishino, pp. 1-67.*
Manor, The Optical Flow Field, 2004, Manor, pp. 1047.*
Campoy, Visual Servoing for UAV's, Chapter 9, Intech, pp. 1-244.*

* cited by examiner

METHOD AND APPARATUS FOR DIGITAL VIDEO LATENCY REDUCTION BY REAL-TIME WARPING

FIELD

An aspect of the present disclosure relates to the field of digital video, and more particularly, to digital video latency reduction of a received digital video frame captured by a remote camera.

BACKGROUND

Digital video is popular due to its high quality, ease of transmission, and encryption capability. Unfortunately, digital video requires compression to retain reasonable bandwidth. This generally creates several video frames of latency, adding as much as 200-400 milliseconds (ms) of delay. In other words, the received digital video is not representative of a scene in real-time due to the latency caused by the compression. Highly interactive tasks, such as remote control tasks require low latency. Remote control tasks require reacting to displayed images with precision, which varies in difficulty depending on the magnitude of the latency. Some current methods for reducing video latency focus on reducing the actual latency of a video stream. Other techniques provide completely synthetic views.

SUMMARY

One aspect of the subject disclosure describes a method for digital video latency reduction of a received digital video frame captured by a remote camera. In one aspect, an image model of the received digital video frame is adjusted according to an approximate field of view from the remote camera at a time the digital video frame is received to form an adjusted image model. In one aspect, the adjusted image model may be overlaid onto the original image model of the received digital video frame to capture a warped image. In one aspect, the warped image is re-projected according to the adjusted image model to form a re-projected image. The re-projected image may then be displayed to approximate a real-time field of view from the remote camera used to capture the digital video frame. In one aspect, an attitude and runway alignment of an unmanned aerial vehicle may be controlled using a displayed, re-projected image having an on-board, remote camera.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
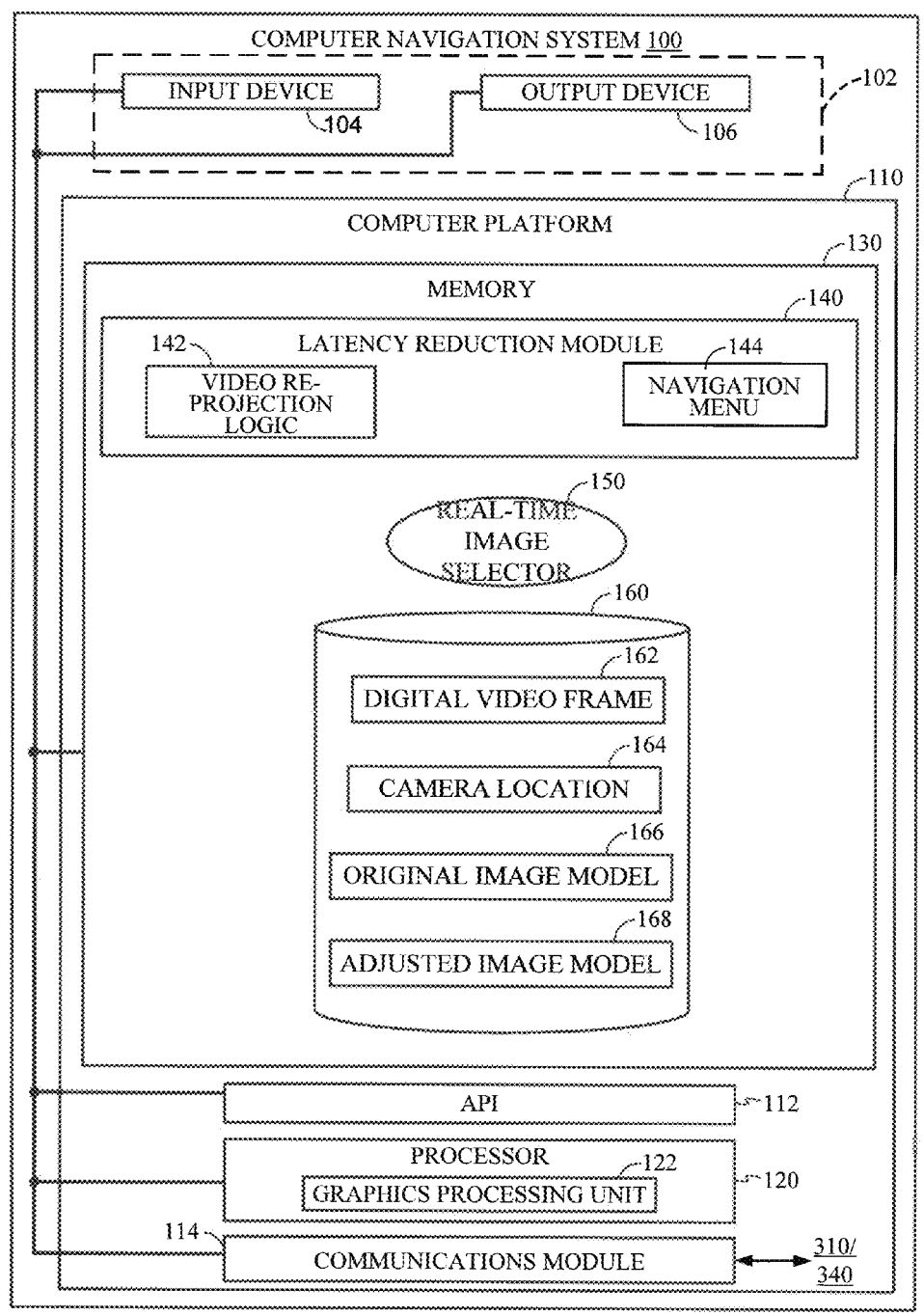
FIG. 1 is a block diagram illustrating a computer navigation system according to one aspect of the subject disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Digital video is popular due to its high quality, ease of transmission, and encryption capability. Unfortunately, digital video requires compression to retain reasonable bandwidth. For example, if digital video is encoded using motion picture experts group (MPEG) technology, the latency required to decode and display the video is in the range of 200-400 milliseconds (ms). In other words, the received digital video is not representative of a scene in real-time due to the latency caused by the compression. This digital video latency is commonly experienced by viewers of digital television who do not notice that the content displayed on their screen does not represent a real-time view for live events.

While digital video latency may be acceptable to viewers of digital television, digital video latency is unacceptable for highly interactive tasks, such as remote control tasks. Remote control tasks require reacting to displayed images with precision, which varies in difficulty depending on the magnitude of the digital video latency. One example of a remote control task is the remote control of a vehicle, such as a remotely piloted unmanned aerial vehicle (UAV). Unfortunately, digital video latency prohibits the viewing of changes to a scene in real-time since changes may occur between the time a scene is captured and a time at which the scene is displayed at a remote location. The total latency for the remote control of a vehicle may depend on properties such as the vehicle response, a radio communication link, and the digital video latency. A total latency in excess of, for example, 200 ms may cause pilot induced oscillations because a display of the digital video frames from an on-board camera does not reflect the commands issued to the vehicle, which causes the pilot to issue additional commands, resulting in a loss of control.

According to various aspects of the subject disclosure, digital video latency reduction by real-time warping is described. In one aspect, each frame of digital video is re-projected (warped) to approximate a geometry of a future video frame in real-time. In one aspect, a camera geometry for each digital video frame captured by the camera is recorded according to a location of the camera at a digital video frame capture time. Subsequently, an estimate is made of an actual, current camera geometry at a time a digital video frame is received. In one aspect, a difference between the recorded geometry and the current camera geometry (location) is used to re-project or warp the video image to correct for the difference in the form of a re-projected image. When the re-projected image is displayed, the content of the original image does not represent a real-time image due to the above-mentioned delay in receiving the image. The re-projected image, although based on a non-real-time image, will approximate a real-time field of view from the camera at the video frame receive time. In one aspect of the subject disclosure, a current camera geometry may be provided by sensors, such as an inertial navigation system, or can be estimated from the scene itself.

As described herein, digital video latency may refer to a time delay between a digital video frame capture time and a time at which the video frame is displayed, which may be in the range of 100 to 200 milliseconds (ms). As further described herein, real-time warping may refer to the remapping of an original geometric image model of digital video frame according to an adjusted geometric image model representing an approximate real-time camera location to approximate a geometry of a future video frame in real-time. As further described herein, a geometric image model (image model) may refer to an intersection between a camera field of view and a plane perpendicular to a camera focal plane at a predetermined distance in front of the camera, such that an original geometric image model (original image model) may refer to a field of view from a remote camera used to capture the digital video frame at a time that the digital video frame is captured, and an adjusted geometric image model (adjusted image model) may refer to a field of view from the remote camera at a time a digital video frame is received.

FIG. 1 illustrates a computer navigation system 100 in accordance with the disclosed aspects. System 100 is operable to access and receive digital video frames 162 and to access and receive vehicle (camera) location information 164. System 100 may comprise a computer platform 110 having a memory 130 operable to store data, logic, and applications executable by a processor 120. A user may interact with system 100 and its resident applications through one or more user interfaces 102, which may include one or more input devices 104 and one or more output devices 106. Additionally, system 100 may exchange communications with external devices 310/340 (FIG. 3) and/or networks through a communications module 114.

Computer platform 110 is operable to transmit data across a network, and is operable to receive and execute routines and applications and display data generated within system 100 or received from any network device or other computer device connected to the network or connected to system 100. Computer platform 130 may be embodied in, for example, one or any combination of hardware, firmware, software, data and executable instructions.

Memory 130 may comprise one or any combination of volatile and nonvolatile memory, such as read-only and/or random-access memory (RAM and ROM), EPROM, EEPROM, flash cards, flash memory cells, an electronic file system, and any memory common to computer platforms. Further, memory 130 may include one or more of any secondary or tertiary storage device, such as magnetic media, optical media, tape, or soft or hard disk, including removable memory mechanisms.

Further, processor 120 may be one or more of an application-specific integrated circuit ("ASIC"), a chipset, a processor, a logic circuit, and any other data processing device. In some aspects, processor 120, or another processor such as an ASIC, may execute an application programming interface (API) layer 112 that interfaces with any resident programs stored in memory 130 of system 100. API 112 may be a runtime environment executing on system 100. In one aspect, API 112, in combination with navigation menu 144, may be used control the operation of a remote vehicle.

Additionally, processor 120 may include graphic processing unit (GPU) 122 embodied in hardware, firmware, software, data, executable instructions and combinations thereof, which enable video latency reduction according to one embodiment. For example, GPU 122 in combination with video re-projection logic 142 of latency reduction module 140 may enable video latency reduction by real-time warping.

Further, communications module 114 may be embodied in hardware, firmware, software, data, executable instructions and combinations thereof, and is operable to enable communications among the various wireless data links. For example, communication module 114 may include the requisite hardware, firmware, software, data, executable instructions and combinations thereof, including transmit and receive chain components for establishing a wireless communication connection.

Further, for example, communication module 114 is operable to receive a plurality of digital video frames 162 and the associated respective camera locations 164 at a video frame capture time, and forwards them to real-time image selector 150 or provides image selector 150 with access to the data. Similarly, for example, communication module 114 is operable to receive navigation data regarding a camera location 164 at a video frame receive time and either forwards them to image selector 150 or provides image selector 150 with access to the data. Subsequently, for example, communications module 114 is operable to forward digital video content to other device components for further processing.

Additionally, one or more input devices 104 for generating inputs into system 100, and one or more output devices 106 for generating information for consumption by the user of the system are provided. For example, input device 104 may include a mechanism such as a key or keyboard, a navigation mechanism (e.g. a joy stick), a mouse, a touch-screen display, a microphone in association with a voice recognition module, etc. In certain aspects, input device 104 provides an interface for receiving user input, such as to activate or interact with an application or module on a remote vehicle. Further, for example, output device 102 may include a display, an audio speaker, a haptic feedback mechanism, etc. Further, user interface 102 may comprise one or any combination of input devices 104 and/or output devices 106.

Figure 2:
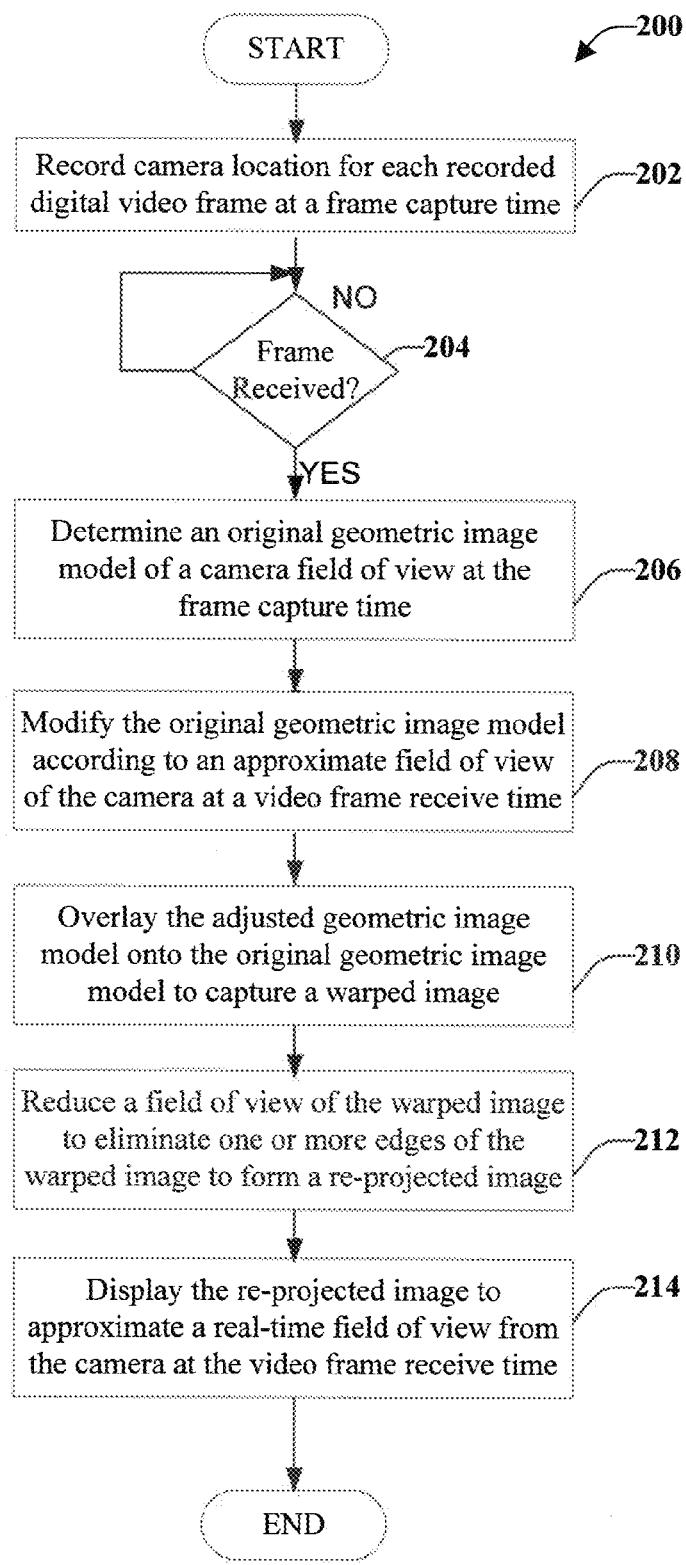
FIG. 2 is a diagram illustrating a flow chart for video latency reduction by real-time warping according to one aspect of the subject disclosure.

FIG. 2 is a diagram illustrating a flowchart 200 for real time video warping, according to one aspect of the present disclosure. At process block 202, a camera location is recorded for each digital video frame at a frame capture time. At process block 204, it is determined whether a frame is received. Once received, at process block 206 an original geometric image model of a camera field of view at the frame capture time is determined. At process block 208, the original geometric image model is modified according to an approximate field of view of the camera at a video frame receive time. At process block 210, the adjusted geometric image model is overlaid onto the original geometric image model to capture a warped image. At process block 212, a field of view of the warped image is reduced to eliminate one or more edges of the warped image to form a re-projected image. At process block 214 the re-projected image is displayed to approximate a real-time field of view from the camera at the video frame receive time.

Referring again to FIG. 1, latency reduction module 140 in combination with GPU 122 may be operable to perform the features of FIG. 2. Representatively, latency reduction module 140, may include video re-projection logic 142 and navigation menu 144. In one aspect, navigation menu 144 may be provided to control the operation of a vehicle. As shown in FIG. 1, real-time image selector 150, may be responsible for receiving digital video frames 162 and camera locations 164 for storage within storage device 160. In one aspect, a digital video latency may refer to a delay between a time at which a video frame is captured by a camera 310 (FIG. 3) and a time at which the video frame is received at communications module 114.

Referring again to FIG. 1, in response to a received digital video frame 162, real-time image selector 150 may determine a camera location 164 at the time the frame is received, which is later in time than the time at which the frame was captured due to video latency. According to the described aspects, original image model 166 may represent a field of view of the camera at a time that digital video frame was captured. As further shown in FIG. 1, adjusted image model 168 may approximate a field of view of a camera at real-time, which may be a time at which the digital video frame was received. According to the described aspects, although the received digital video frame 162 is not current (due to the video latency), video re-projection logic 142 may re-project digital video frame 162 using the adjusted image model 168 to approximate a current real-time view from a camera 310 (FIG. 3).

Figure 3:
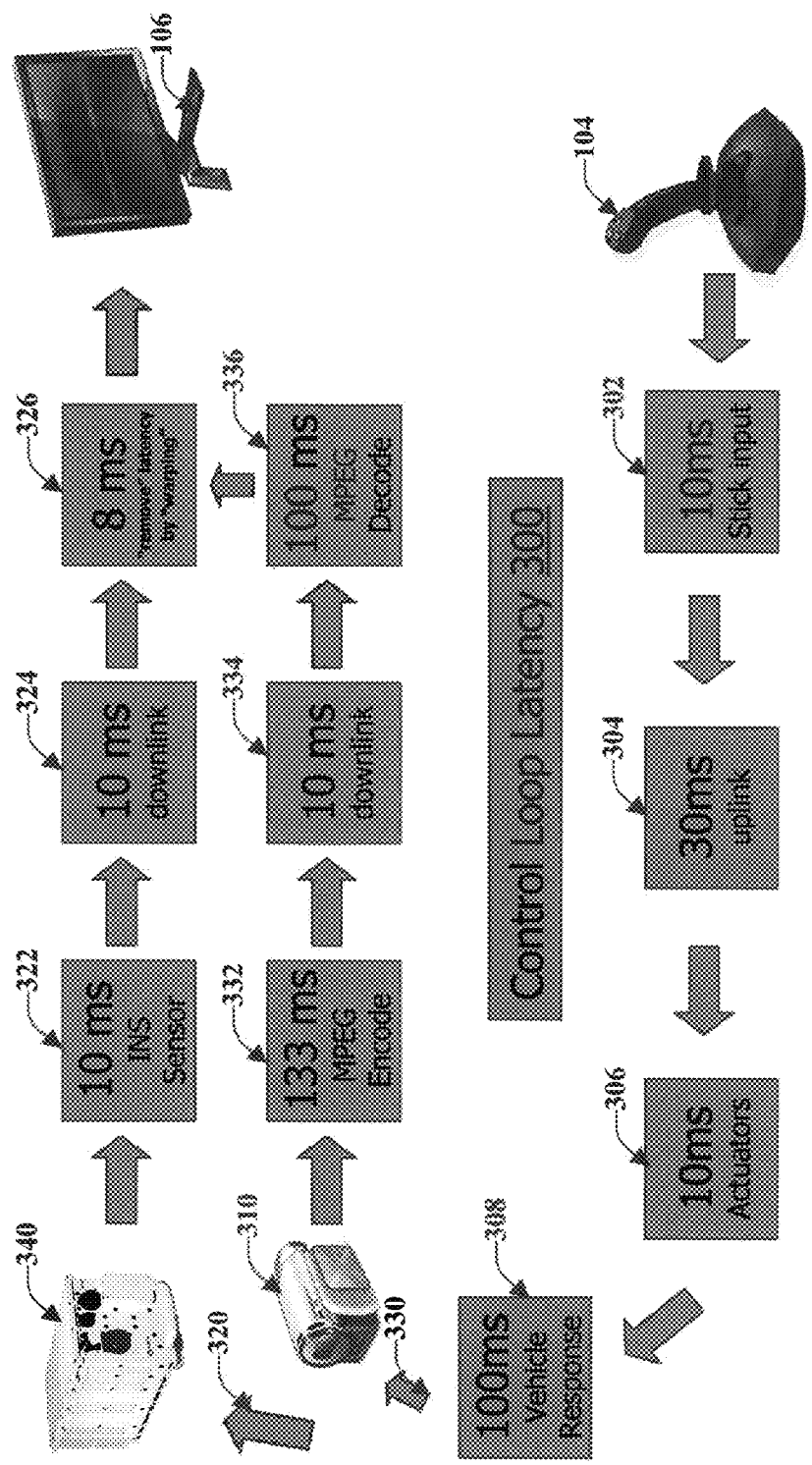
FIG. 3 is a diagram illustrating a reduced control loop latency according to one aspect of the subject disclosure.

FIG. 3 is a block diagram illustrating a reduced control loop latency 300, according to one aspect of the present disclosure. As shown in FIG. 3, input device 104 may represent a joystick or controller for controlling a vehicle. Blocks 302-308 represent latency times for directing a command from controller 104 to a remote vehicle. As further shown in FIG. 3, a video frame latency path 330 (332-336) is shown in relation to a video warping path 320 that includes blocks 322-326. The total latency time provided by video latency path 330 include a total of 243 ms. To avoid the latency caused by video latency path 330, a video warping path 320 is described, which includes a total latency time of 28 ms. Representatively, a camera location at a time when a video frame is received may be determined using for example, an inertial navigation system 340 which may provide a sample vehicle position and attitude, including a roll, pitch, and yaw for an unmanned aerial vehicle (UAV). Alternatively, a global positioning system (GPS) may also be used to provide a current location of camera 310.

Figure 8:
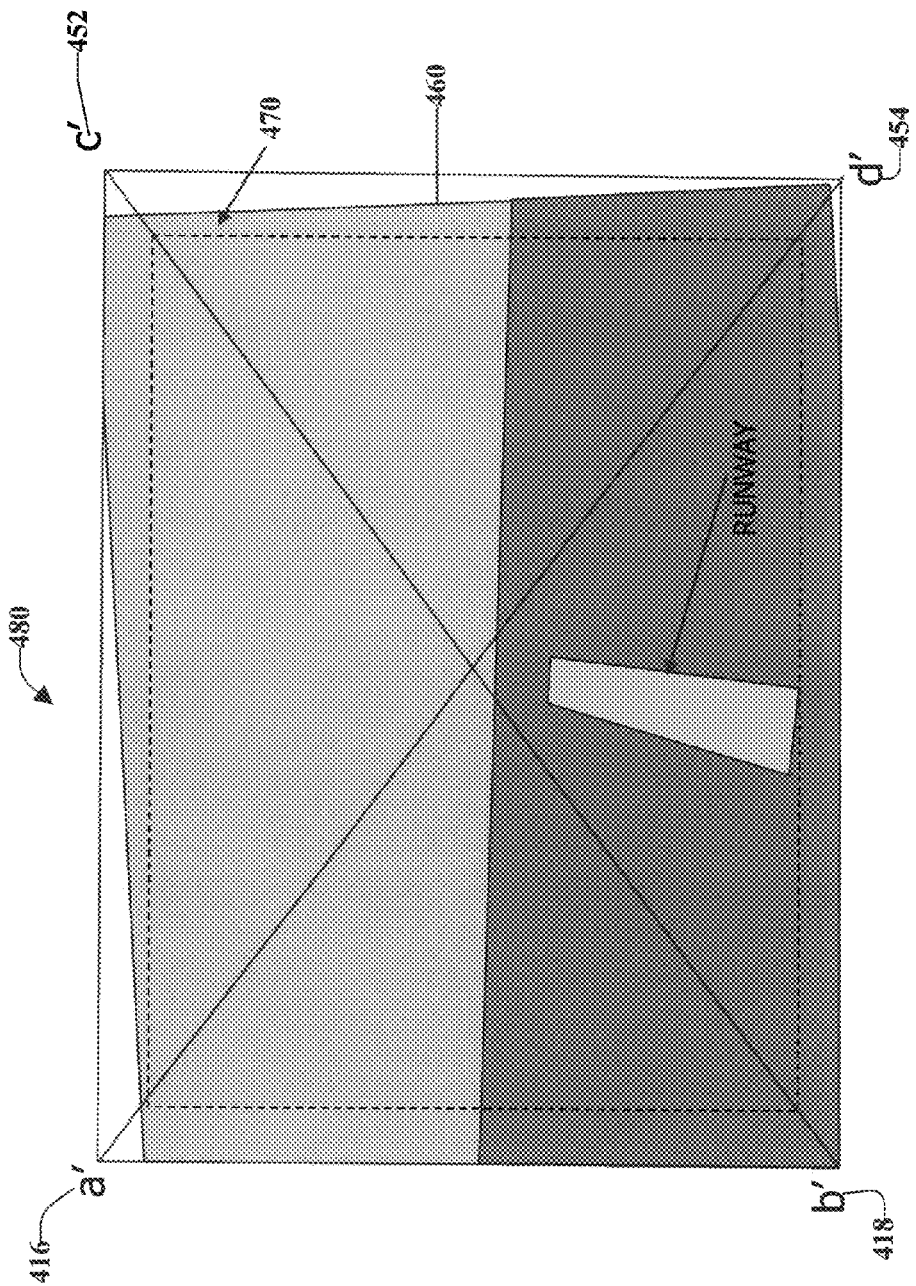
FIG. 8 is a diagram illustrating an example of the warped image of FIG. 7, re-projected according to the adjusted geometric image model to form a re-projected image according to one aspect of the subject disclosure.
Figure 13:
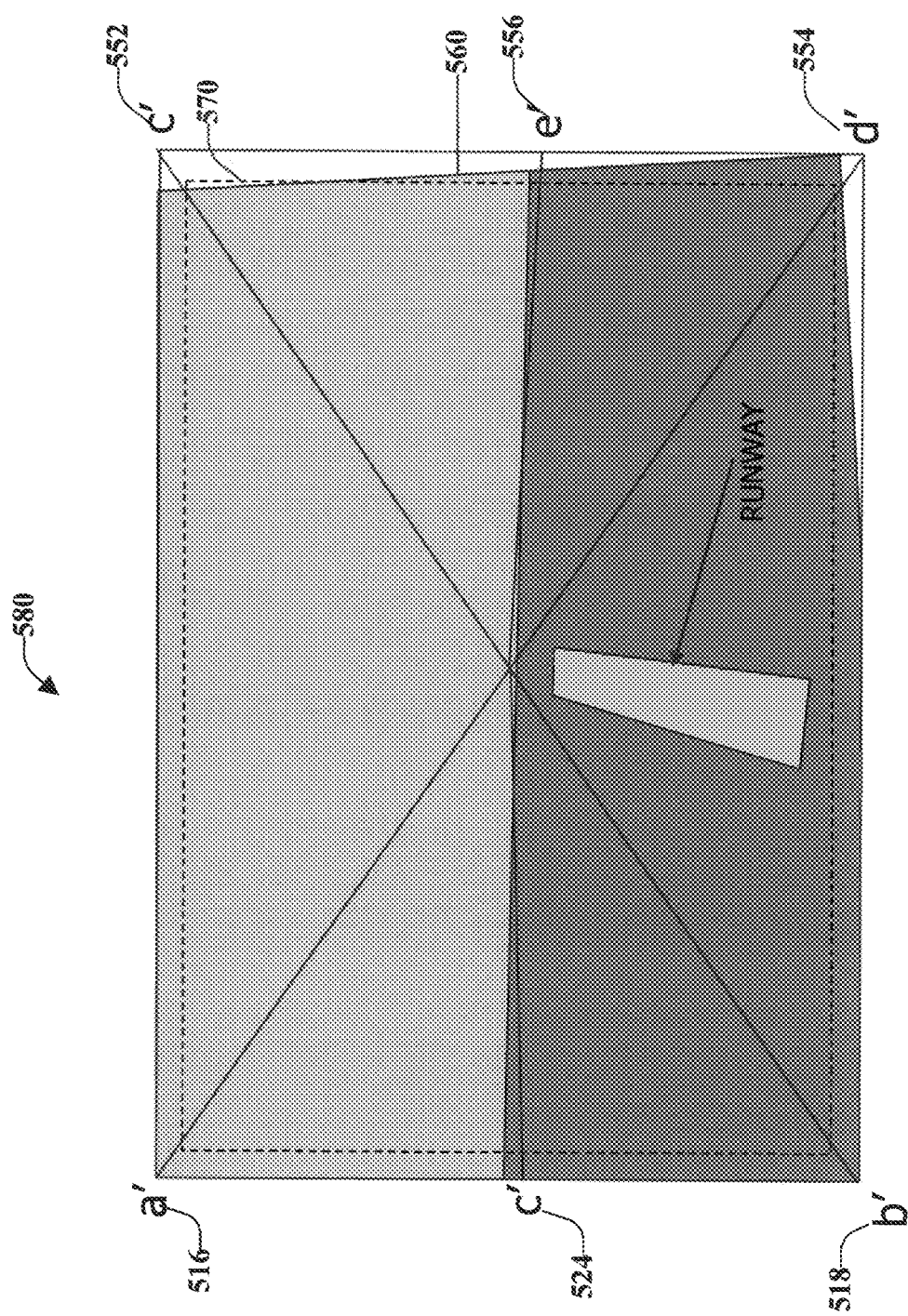
FIG. 13 is a diagram illustrating an example of the warped image of FIG. 12, re-projected according to the adjusted geometric image model to form a re-projected image according to one aspect of the subject disclosure.

As shown in FIG. 3, the delay required to receive or approximate a real-time location of camera 310 is less than the video frame latency path 330. By taking advantage of the reduced video frame warping path 320, a geometric image model may be used to approximate a current real-time location of camera 310. Using this approximate model, an original digital frame image may be remapped according to the approximated model to provide a warped image, for example as shown in FIGS. 8 and 13.

Figure 4:
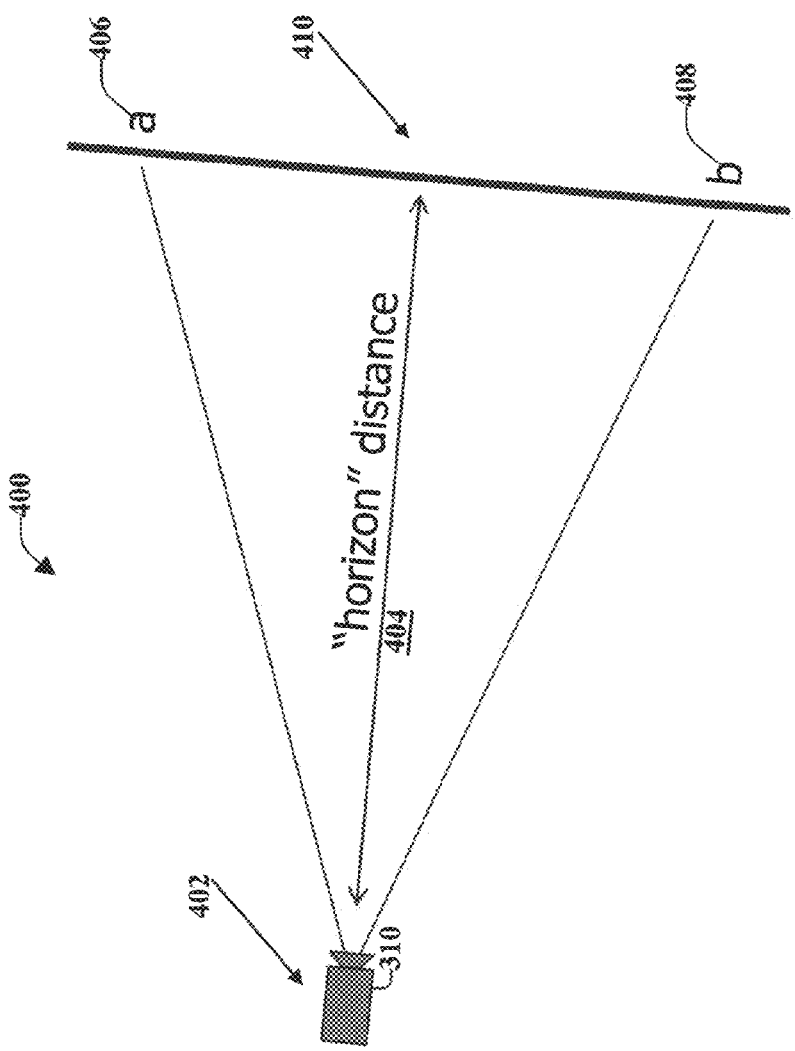
FIG. 4 is a diagram illustrating an example of a camera geometry and field of view at a digital video frame capture time according to one aspect of the subject disclosure.

FIG. 4 is a diagram 400 illustrating a location 402, of camera 310 at a video frame capture time. Representatively, a horizontal distance 404 to an image plane 410 is shown. Also illustrated is a field of view of camera 310, which intersects plane 410 at points a 406 and b 408. FIG. 4 is a simplified view of, for example, a frustum view of the camera field of view intersection with image plane 410.

Figure 5:
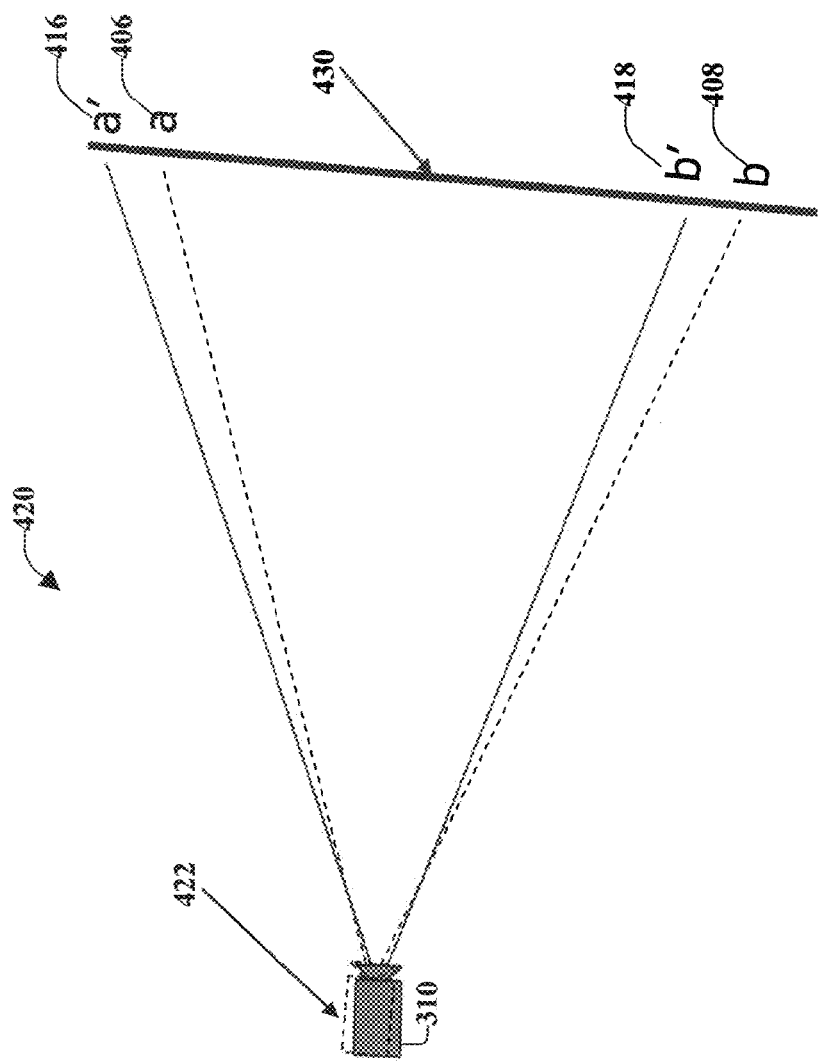
FIG. 5 is a diagram illustrating an example of a camera geometry and field of view at a digital video frame receive time according to one aspect of the subject disclosure.

FIG. 5 is a diagram 420 illustrating a location 422 of camera 310 at a time at which a digital video frame is received, which may be referred to herein as a real-time location of camera 310. Based on the real-time location 422 of camera 310, a frustum view of the intersection between the field of view of camera 310 and image plane 430 is shown based on elements a' 416 and b' 418.

Figure 6:
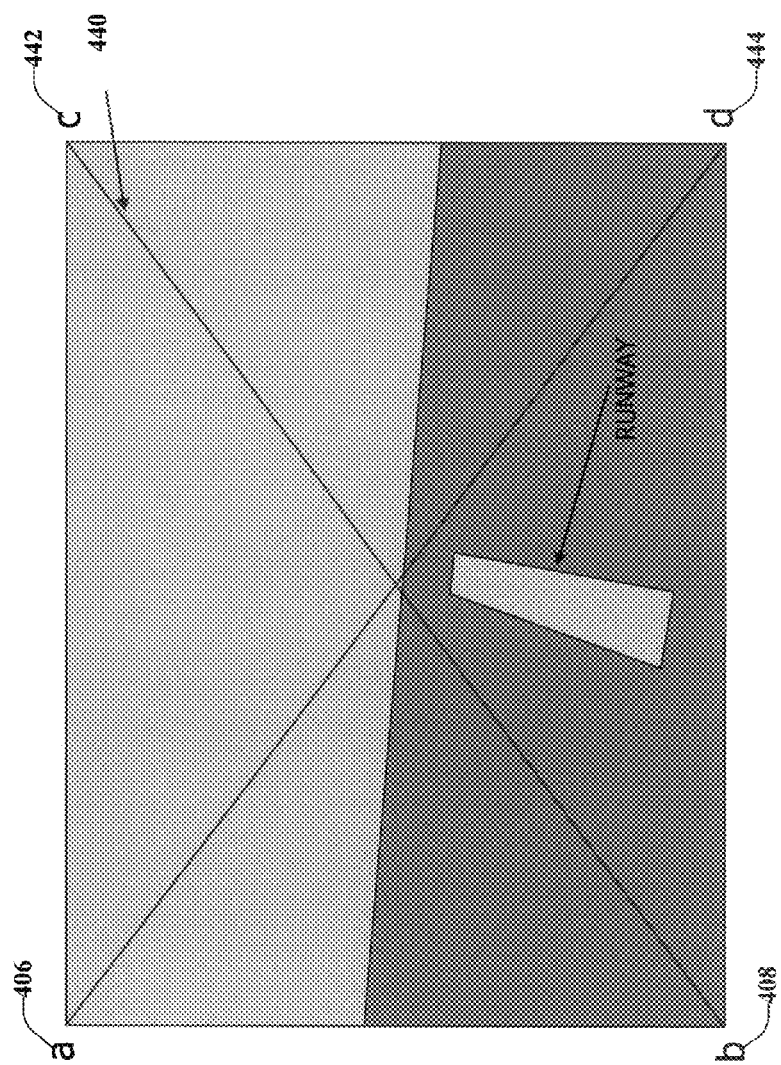
FIG. 6 is a diagram illustrating an example of an original geometric image model of a digital video frame at a frame capture time according to one aspect of the subject disclosure.

FIG. 6 is a block diagram illustrating a frustum view 440 at a video frame capture time. Representatively, a runway is shown in the distance. In the aspect described in FIG. 6, an attitude of a vehicle is considered due to a distance from the runway. As further described with reference to FIGS. 9-13, a ground plane may be included to allow for vehicle takeoffs and landings.

As described herein, frustum view 440 may be referred to as an original geometric image model of a digital video frame, which represents a field of view of a camera at a time that the digital video frame is captured. Unfortunately, for the reasons described above, by the time the digital video frame represented by FIG. 6 is received by, for example, system 100, that digital video frame no longer represents a real-time view from camera 310. According to one aspect of the present disclosure, this latent image may be modified to form a warped image to illustrate a real-time location of camera 310.

Figure 7:
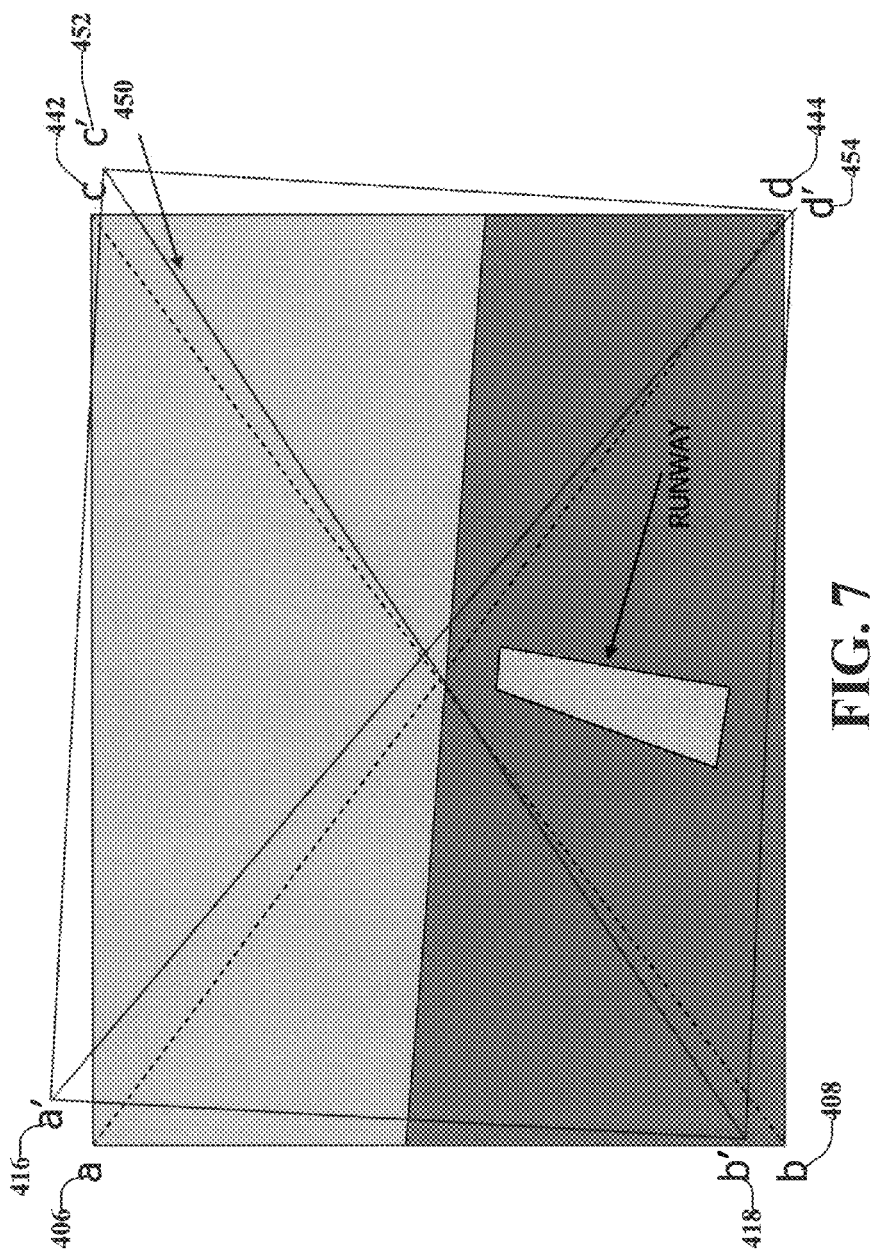
FIG. 7 is a diagram illustrating an example of an adjusted geometric image model overlaid onto the original geometric image model of FIG. 6 to capture a warped image according to one aspect of the subject disclosure.

FIG. 7 is a diagram, which illustrates the overlaying of an adjusted geometric image model 450 onto original geometric image model 440. Representatively, the adjusted geometric image model 450 is represented by points a' 416, b' 418, c' 452, and d' 454. Once the adjusted geometric image 450 is overlaid onto the original geometric image model 440, a warped image may be determined to approximate a real-time camera view, for example, as shown in FIG. 8.

FIG. 8 represents a re-mapping of an original geometric image according to an adjusted geometric image model based on points a' 416, b' 418, c' 452, and d' 454. As shown in FIG. 8, warped image 460 is no longer aligned with the mapping based on the adjusted geometric model and includes various edges (gaps) that are out of alignment with the adjusted model. In one aspect of the present disclosure, a field of view of the original geometric image model may be larger than a field of view for a re-projected image 480. This re-projected image field of view 470 is shown such that an image is captured, based on the reduced field of view, to provide re-projected image 480. As shown in FIG. 8, the latent original image is re-projected to represent a real-time field of view from the camera, which will enable more accurate control of, for example, a vehicle, including a camera as well as a remote control application.

Figure 9:
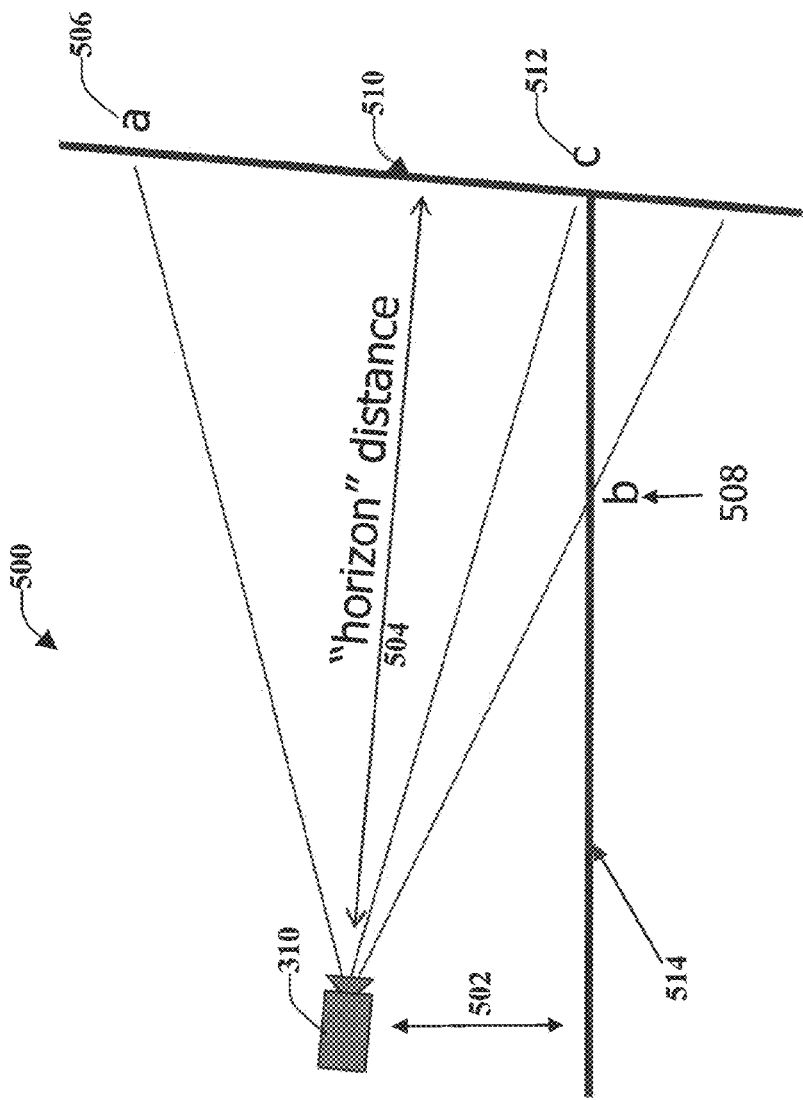
FIG. 9 is a diagram illustrating an example of a camera geometry and field of view at a digital video frame capture time, including a ground plane, according to one aspect of the subject disclosure.
Figure 10:
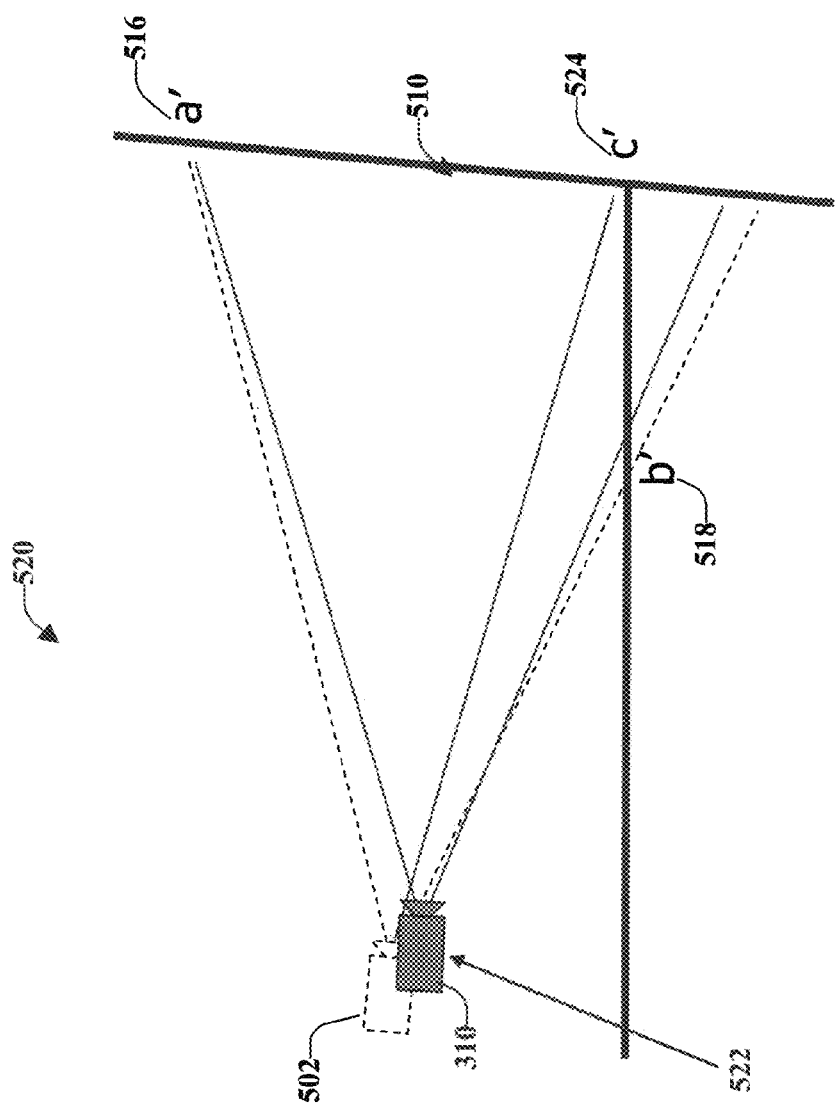
FIG. 10 is a diagram illustrating an example of a camera geometry and field of view at a digital video frame receive time, including a ground plane, according to one aspect of the subject disclosure.
Figure 11:
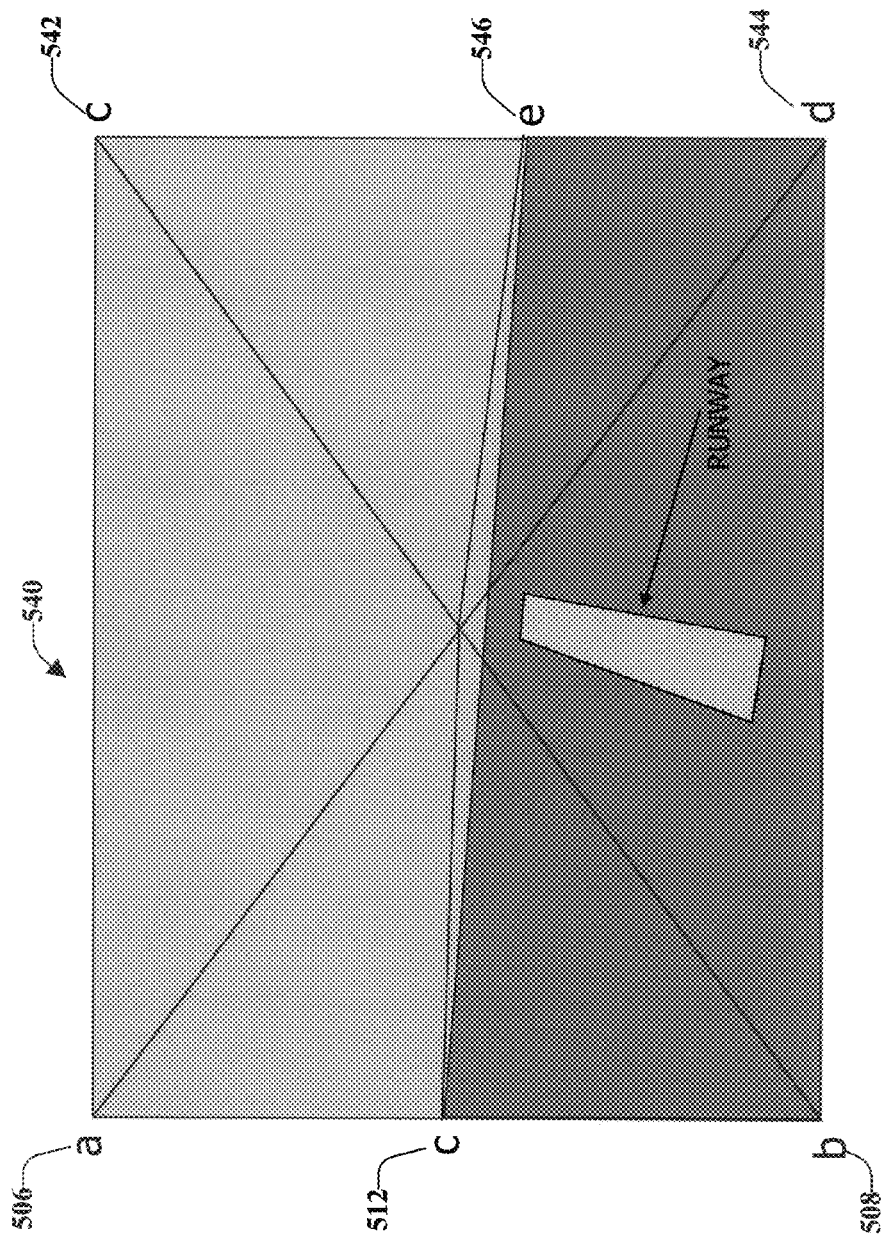
FIG. 11 is a diagram illustrating an example of an original geometric image model of a digital video frame at a frame capture time, including a ground plane, according to one aspect of the subject disclosure.
Figure 12:
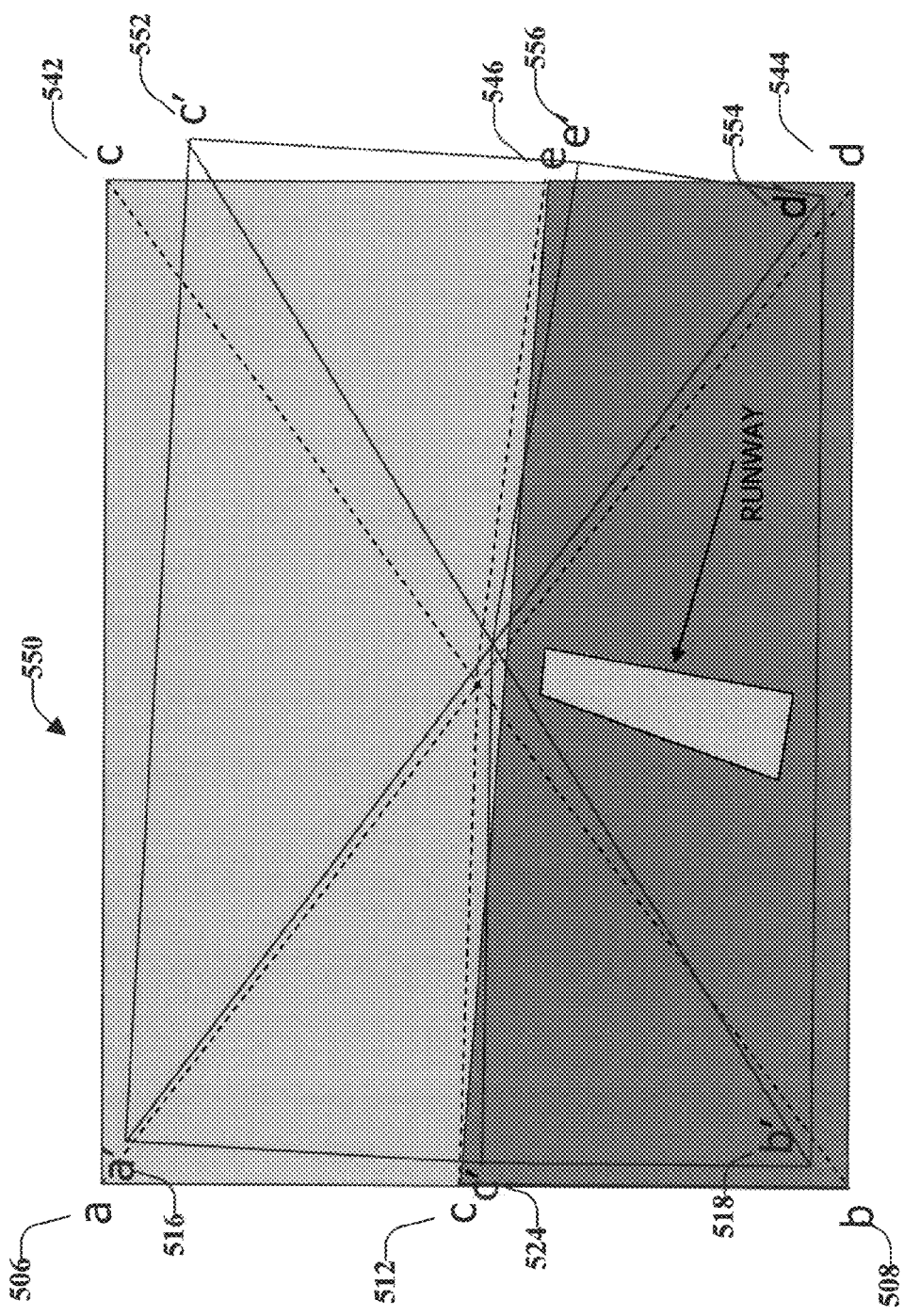
FIG. 12 is a diagram illustrating an example of an adjusted geometric image model overlaid onto the original geometric image model to capture a warped image according to one aspect of the subject disclosure.

FIGS. 9-13 represent similar features as described with reference to FIGS. 5-8, however, shown to include a ground plane 514 as introduced in FIG. 9. As illustrated in FIG. 10, a subsequent location 522 of the camera 310 is captured to provide an adjusted geometric image model. As shown in FIG. 11, an original geometric image model 540 includes a ground plane identified by point numerals 512 (c) and 546 (e), based on original mapping points a 506, b 508, c 542, and d 544. FIG. 13 is a diagram, which illustrates the overlaying of an adjusted geometric image model 550 onto original geometric image model 540. Representatively, the adjusted geometric image model 550 is represented by points a' 516, b' 518, c' 552, and d' 554, as well as ground plane points c' 524 and e' 556. Once the adjusted geometric image model 550 is overlaid onto the original geometric image model 540, a warped image may be determined to approximate a real-time camera view, for example, as shown in FIG. 13.

FIG. 13 represents a re-mapping of an original geometric image model 540 according to an adjusted geometric image model 550 based on points a' 516, b' 518, c' 552, and d' 554, as well as ground plane points c' 524 and e' 556. As shown in FIG. 13, warped image 560 is no longer aligned with the mapping based on the adjusted geometric model 550 and includes various edges (gaps) that are out of alignment with the adjusted model. In one aspect of the present disclosure, a field of view of the original geometric image model 550 may be larger than a field of view for a re-projected image 580. This re-projected image field of view 570 is shown such that an image is captured, based on the reduced field of view, to provide re-projected image 580. As shown in FIG. 13, the latent original image is re-projected to represents a real-time field of view from the camera, which will enable more accurate control for landing a vehicle, including a camera as well as a remote control application.

Aspects of the subject technology bypass the extra latency inherent to digital compression/decompression and delay by using a wireless data link and an inertial navigation system to provide a low latency data path for determining a real-time location of a camera included within a vehicle. Although received digital video data from a vehicle including the camera is still latent, a relative position and attitude indicated by the digital video data may be corrected to approximate a geometry of a future video frame in real-time. In some aspects, the subject technology may be applied in radio communication, wireless communication, and electronics. In some aspects, the subject technology may be applied in non-aerial vehicle control, for example, such as standard automobiles.

In accordance with various aspects of the subject disclosure, the subject technology is related to video latency reduction. In some aspects, the subject technology may be used in various markets, including for example and without limitation, remote control tasks based on a video image that require low latency. For example, the video reduction latency, according to one aspect, is described for landing a remotely piloted vehicle. The described aspects, however, are not limited to landing a remotely piloted vehicle, and may be applied to any control task that requires low latency.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology.

A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for digital video latency reduction of a received digital video frame captured by a remote camera attached to a vehicle, the method comprising:
   receiving the digital video frame captured by the remote camera, wherein the received digital video frame is associated with an original image model representing a field of view from the remote camera at a time the digital video frame is captured;
   detecting a change in the vehicle position and attitude;
   adjusting the original image model of the received digital video frame based on the detected change in the vehicle position and attitude and a time difference between a time the digital video frame is received and the time the digital video frame is captured, to form an adjusted image model representing an approximation of a future field of view of what could be seen from the remote camera at the time the digital video frame is received, wherein the time the digital video frame is received is later in time than the time the digital video frame is captured due to video latency;
   overlaying the adjusted image model onto the original image model of the received digital video frame to capture a warped image; and
   re-projecting the warped image according to the adjusted image model to form a re-projected image that approximates a view from the remote camera used to capture the received digital video frame at the time the digital video frame is received, wherein the re-projected image accounts for a digital video latency between the time the digital video frame is captured and the time the digital video frame is received.

2. The method of claim 1, wherein the vehicle is an unmanned aerial vehicle, the method further comprising:
   displaying a plurality of re-projected images based on a plurality of received digital video frames captured by the remote camera on a display at a remote location; and
   controlling an attitude and runway alignment of the unmanned aerial vehicle in response to user commands from viewing the plurality of displayed, re-projected images.

3. The method of claim 1, further comprising:
   storing a camera attitude for each recorded digital video frame at a time that each digital video frame is recorded according to received navigation data.

4. The method of claim 3, wherein the camera attitude for each recorded frame is received over a wireless link.

5. The method of claim 1, wherein overlaying further comprises:
   mapping the received digital video frame onto the adjusted image model to form the warped video frame; and
   reducing a field of view of the warped video frame to eliminate one or more edges of the warped video frame to form the re-projected image.

6. The method of claim 1, wherein adjusting further comprises:
   re-mapping the received digital video frame to determine the original image model corresponding to a field of view of the remote camera at a digital video frame capture time; and
   modifying the original image model of the received digital video frame to approximate the real-time field of view from the remote camera at the time the digital video frame is received to form the adjusted image model.

7. The method of claim 1, further comprising:
   rendering, using a graphics processing unit, a composite two-dimensional display of the digital video frame by applying the video frame to a three-dimensional geometry corresponding to a field of view of the remote camera at the time the video frame is captured to approximate a real-time view from a vehicle including the camera.

8. A non-transitory computer readable medium having processor-executable software instruction to perform a method digital video latency reduction of a received digital video frame captured by a remote camera attached to a vehicle, comprising:
   re-mapping the digital video frame to determine an original geometric image model corresponding to a field of view from the remote camera used to capture the digital video frame at a digital video frame capture time;
   detecting a change in the vehicle position and attitude;
   modifying the original geometric image model according to an approximate field of view from the remote camera at a digital video frame receive time based on the detected change in the vehicle position and attitude and a time difference between the digital video frame receive time and digital video frame capture time, to form an adjusted geometric image model, wherein the digital video frame receive time is later than the digital video frame capture time due to video latency;
   overlaying the adjusted geometric image model onto the original geometric image model to capture a warped image; and reducing a field of view of the warped video frame image to eliminate one or more edges of the warped video frame image to form a re-projected image that approximates a view from the remote camera at the digital video frame receive time; and displaying the re-projected image to approximate a real-time field of view from the camera at the video frame receive time, wherein the re-projected image accounts for a digital video latency between the digital video frame capture time and digital video frame receive time.

9. The non-transitory computer readable medium of claim 8, further comprising:

maintaining an attitude and runway alignment of an unmanned aerial vehicle using a displayed, re-projected image.

10. The non-transitory computer readable medium of claim 9, wherein re-mapping further comprises:

adjusting the original geometric image model of a digital video frame according to a delay between a video frame receive time and a video frame capture time to form the adjusted geometric image model.

11. The non-transitory computer readable medium of claim 8, wherein displaying further comprises:

rendering, using a graphics processing unit, a composite two-dimensional display of the video frame by applying the video frame to a three-dimensional geometry corresponding to a field of view of the camera at the video frame capture time.

12. The non-transitory computer readable medium of claim 11, further comprising:

storing a camera attitude for each recorded frame, at a time that each frame is recorded, according to received navigation data, wherein the camera attitude for each recorded frame is received over a wireless link.

13. The non-transitory computer readable medium of claim 8, wherein overlaying further comprises:

mapping the video frame onto the adjusted geometric image model to form the warped video frame image.

14. The non-transitory computer readable medium of claim 8, wherein overlaying further comprises:

warping each frame of digital video to approximate a geometry of a future video frame in real-time.

15. A system for digital video latency reduction of a received digital video frame captured by a remote camera attached to a vehicle, comprising:

a transceiver configured to receive the digital video frame and a camera geometry at a digital video frame capture time for the digital video frame;

a memory operable to store the received digital video frame and the camera geometry;

a graphics processing unit operable to:

determine an original geometric image model corresponding to a field of view from the remote camera used to capture the digital video frame, at the digital video frame capture time, detect a change in the vehicle position and attitude;

overlay an adjusted geometric image model onto the original geometric image model to capture a warped image, the adjusted geometric image model being based on the detected change in the vehicle position and attitude and a time difference between a digital video frame receive time and the digital video frame capture time, and corresponding to an approximate field of view from the remote camera at the digital video frame receive time, wherein the time the digital video frame was received is later in time than the time the digital video frame was captured due to video latency, and reduce a field of view of the warped video frame to eliminate one or more edges of the warped image to form a re-projected image;

a display operable to display the re-projected image to approximate a field of view from the camera used to capture the video frame according to a location of the camera at the video frame receive time, wherein the re-projected image accounts for a digital video latency between the digital video frame capture time and the digital video frame receive time; and a controller operable to control the vehicle, including the remote camera, according to a re-projected image.

16. The system of claim 15, wherein the graphics processing unit is further operable to warp each frame of digital video to approximate a geometry of a future video frame in real-time.

17. The system of claim 15, wherein the graphics processing unit is further operable to re-map the digital video frame to determine the original geometric image model corresponding to a field of view of the camera at the video frame capture time and to modify the original geometric image to approximate the real-time field of view of the camera at the video frame receive time to form the adjusted geometric image.

18. The system of claim 15, further comprising an application programming interface to control an attitude and runway alignment of an unmanned aerial vehicle using a displayed, re-projected image.

19. The system of claim 15, wherein the vehicle comprises an unmanned aerial vehicle.

20. The system of claim 19, wherein the vehicle comprises an inertial navigation system operable to provide a camera geometry for each recorded digital video frame at a time the frame is captured.

* * * * *